Patented July 1, 1941

2,247,668

UNITED STATES PATENT OFFICE 2,247,668

VEHICLE

William C. Rosenthal, Chicago, Ill., assignor to International Harvester Company, a corporation of New Jersey Application June 8, 1940, Serial No. 339,428

34 Claims. (Cl. 180—1)

This invention relates to a vehicle, and more particularly to an improved rear end construction for a vehicle of the agricultural-tractor type.

The invention contemplates and has for its principal object the provision of an improved rear end construction for an agricultural tractor of the type forming the subject-matter of assignee's co-pending application, Serial No. 242,239, filed November 25, 1938, now Patent 2,221,546. This particular tractor is of the offset type in which the tractor body is offset to one side of the longitudinal center line of the tractor proper, so that the wheels at one side of the tractor are located closely adjacent the body while the wheels at the other side are spaced transversely a substantial distance from the body. In accordance with the general purpose of this tractor design the operator's station is located in the space between the tractor body and the far rear wheel so that the operator may be situated in a position from whence he may view the ground immediately ahead of the tractor rear wheels.

It is an important object of this invention to provide an improved rear axle construction consisting of similar final-drive housing units secured respectively to opposite sides of the tractor body, a spacing or extension housing being interposed between one side of the body and one final-drive housing so that that final-drive housing is spaced transversely a substantial distance from one side of the body.

Another important object is to locate the operator's station substantially immediately above this extension housing.

Another object is to provide the operator's station with a seat carried at its opposite sides respectively by the body and the far final-drive housing.

Another object is to provide the operator's station with a platform disposed generally horizontally and arranged between the far housing and the proximate side of the tractor body or frame.

It is another important object of the present invention to locate a plurality of control members at the forward portion of the operator's station, and preferably to mount the control members on the forward part of the platform.

Another object of the invention is to provide an improved control arrangement for operating the tractor brakes.

Another object is to provide an improved arrangement for operating the tractor engine clutch.

And another object is to provide an improved rear end construction providing for a compact arrangement of the tractor structural parts, the operator's station, and the fenders for the opposite drive wheels.

Other objects will become apparent as the disclosure is more fully made.

Figure 1:
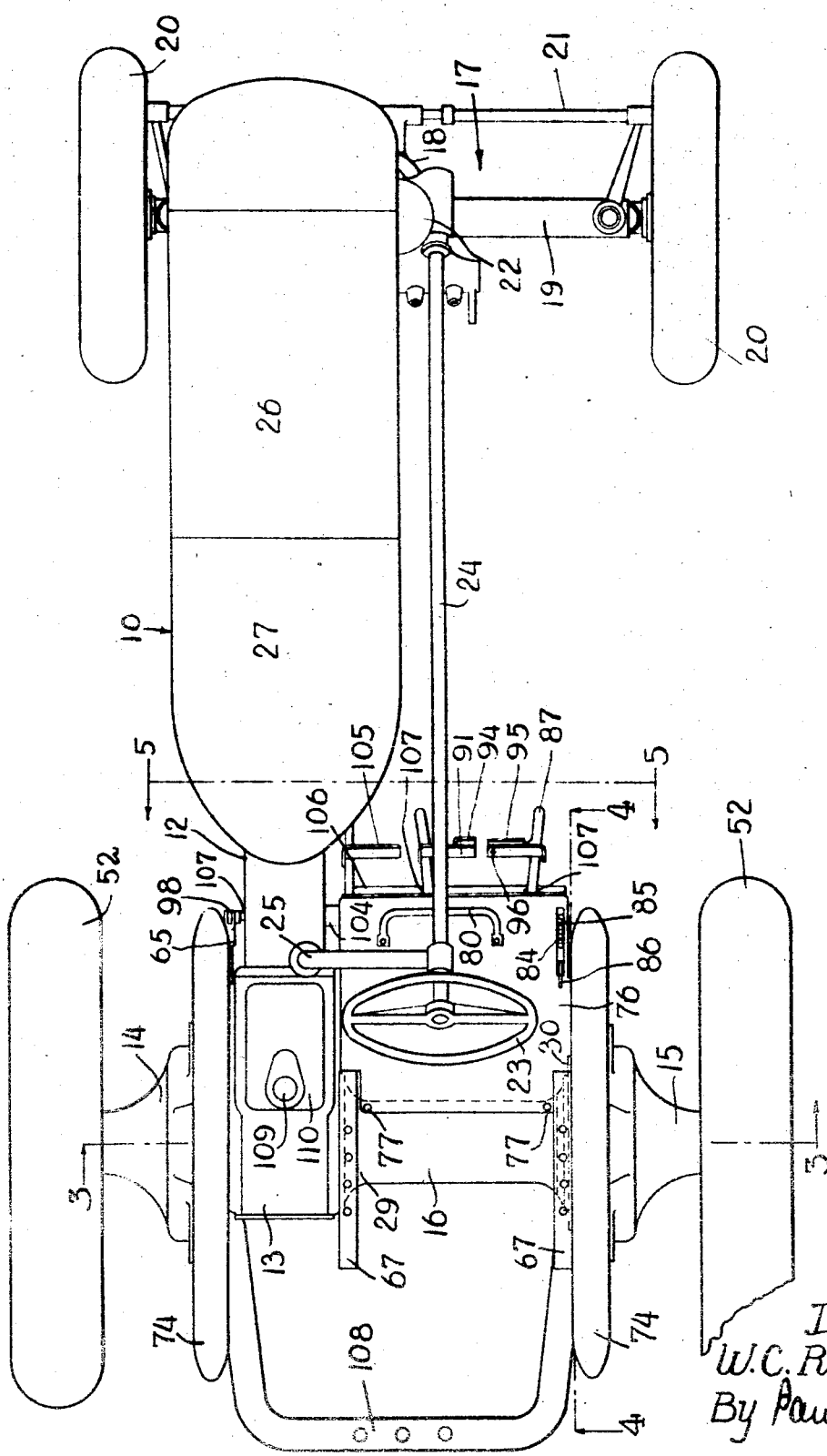
Figure 1 is a plan view of a preferred form of tractor of the offset type.

As best shown in Figure 1, the tractor chosen for the purpose of illustration is of the offset type and is provided with a longitudinal main frame or body generally indicated by the numeral 10. This body consists of a forwardly disposed power plant 11, a longitudinal intermediate body part 12, a rear body or frame part 13, and a rear axle structure consisting of a pair of opposite final-drive housing units 14 and 15, arranged at the right- and left-hand side of the tractor respectively. The right-hand housing unit 15 is spaced transversely a substantial distance from the right-hand side of the body or frame part 13 by an extension or supporting housing 16.

The forward part of the body is suitably carried on a front axle assembly 17 including a supporting part 18 carried at the forward end of the power plant 11 and having pivotally mounted thereon on a longitudinal horizontal axis a transverse axle 19. This axle carries at opposite ends thereof a pair of front wheels 20. The wheels are suitably steered by steering linkage 21 operated by appropriate mechanism, not shown, contained in a steering gear housing 22 forming part of the supporting part 18. The steering mechanism in the housing 22 is operated by a steering wheel 23 located at the rearward end of a steering rod 24. A supporting bracket 25 is secured at its lower end to the intermediate body part 12 for supporting the steering rod 24. The forward part of the body is completed by the usual radiator and hood construction, generally indicated at 26, and fuel tank, generally indicated at 27. The fuel tank 27 is supported on a bracket 28 mounted on the upper part of the intermediate body part 12.

Figure 3:
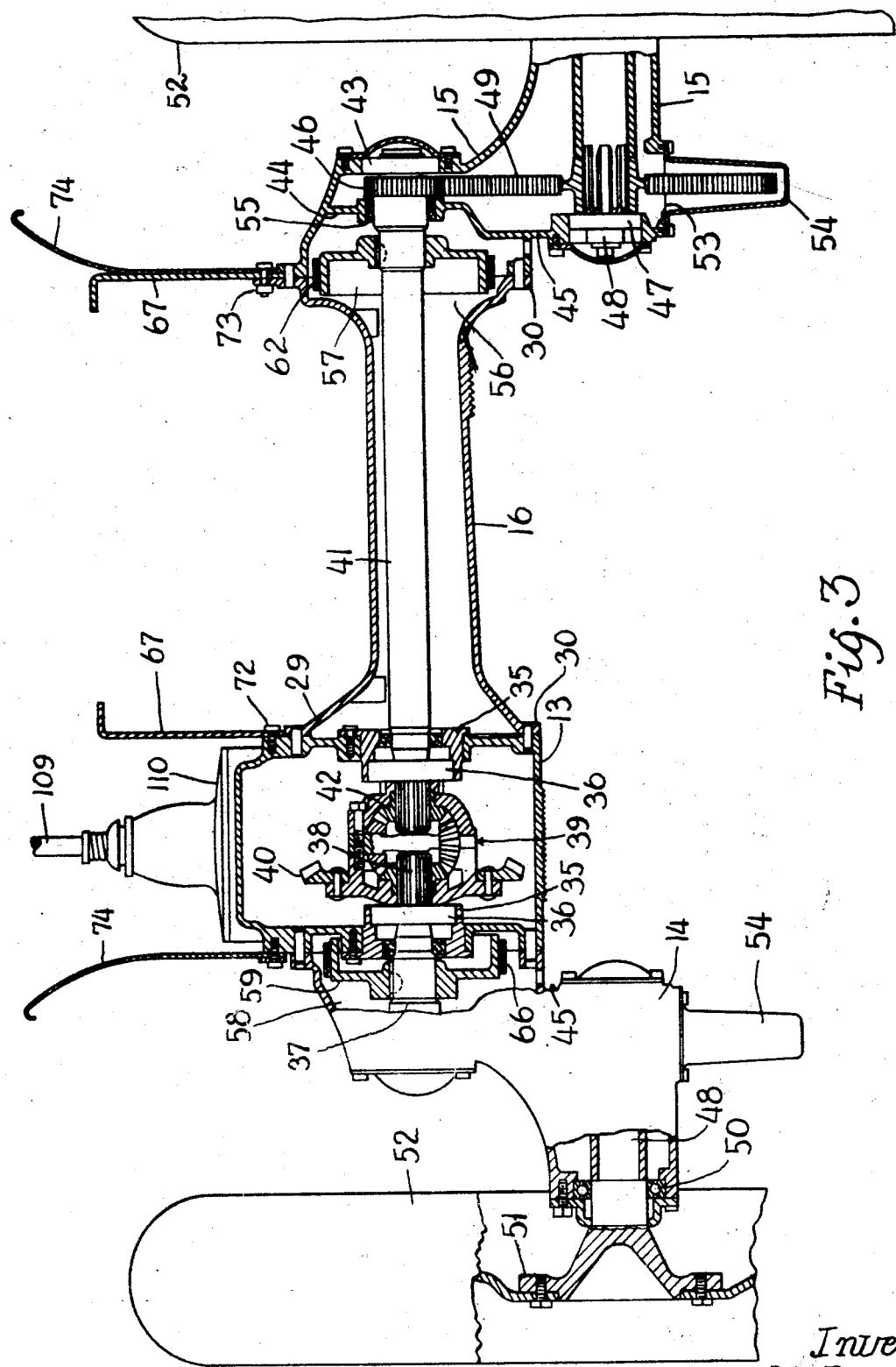
Figure 3 is an enlarged transverse sectional view of the rear axle structure taken substantially along the line 3—3 of Figure 1.

As best shown in Figure 3, the rear body or frame part 13 is provided with opposite flat surfaces. The left-hand side of the body is formed with an opening closed by the left-hand final-drive housing 14. The right-hand side of the body is formed with an opening closed by the bell-shaped end 29 of the extension housing or supporting part 16. This housing 16 extends transversely from the right side of the tractor and has its outer end enlarged and provided with a circumferential flange 30. The right-hand final-drive housing 15 is secured to this flange.

Figure 2:
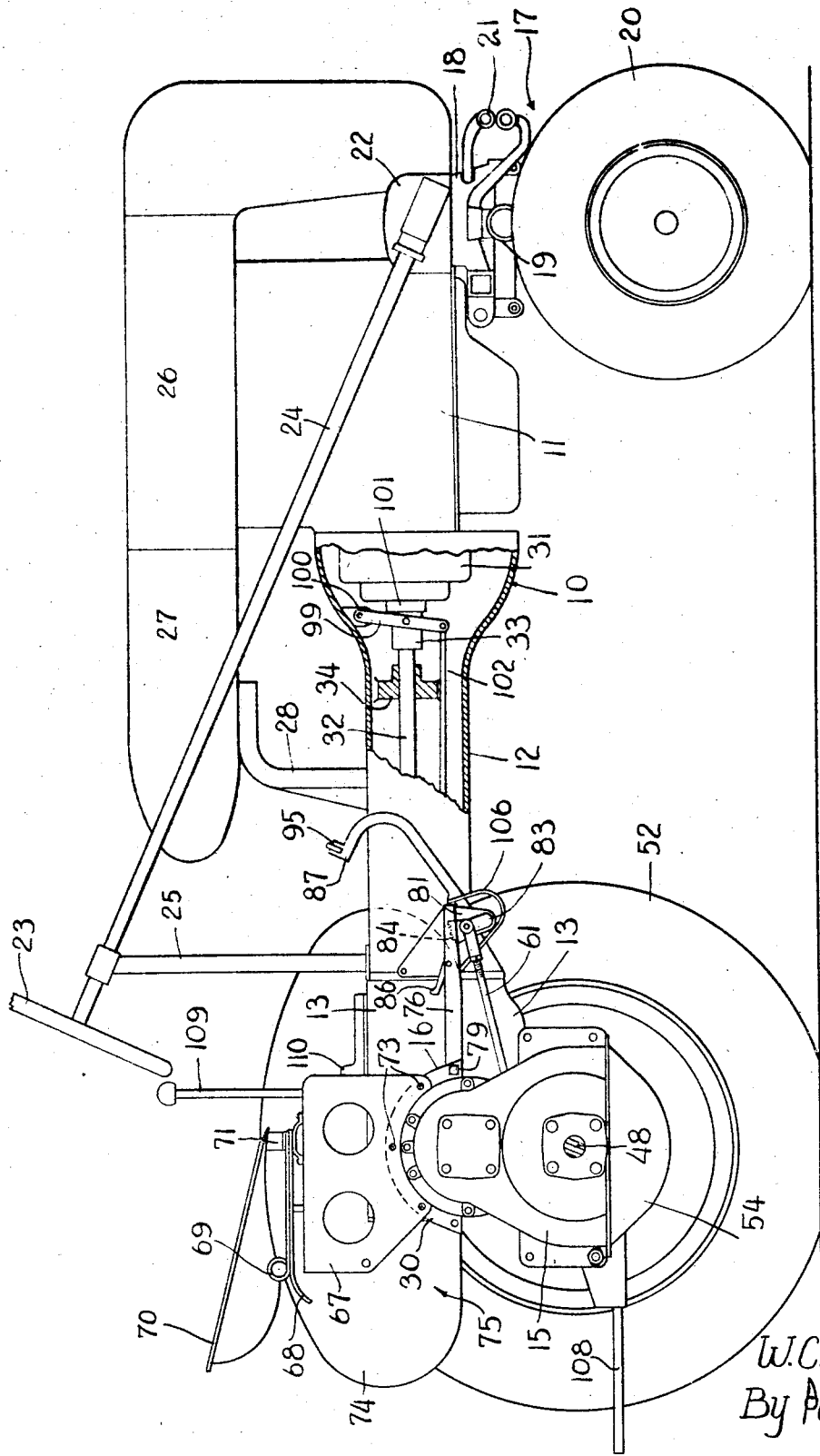
Figure 2 is a side elevational view of the same tractor, a portion of the intermediate body part of the tractor being broken away to expose the clutch and clutch operating mechanism.

As best shown in Figure 2, the power plant 11 includes an engine clutch 31 which may be of any conventional type. This clutch is associated with a longitudinal, rearwardly extending propeller shaft 32, the forward end of which is connected to a clutch part 33, and an intermediate portion of which is suitably journaled by a wall portion 4 in the forward portion of the intermediate body part 12. The rear end of the propeller shaft 32 is associated in the conventional manner with a change speed transmission, not shown, contained in the rear body part 13, the rear body or frame part thus serving as a transmission and differential housing. As best shown in Figure 3, the longitudinal walls of the body part 13 have mounted therein bearing carriers 35, each of which carries an anti-friction bearing 36. The left-hand bearing 36 journals a short drive shaft 37. This shaft extends transversely of the tractor and has its inner end splined to a pinion 38 forming part of a differential assembly 39. This assembly may be of any suitable form, and includes a large bevel gear 40 which may be operated in the usual manner by a bevel pinion driven by the transmission gearing, not shown. The right-hand bearing 36 carries the inner end of a comparatively longer drive shaft 41, the inner end of which is splined to a pinion 42 forming part of the differential assembly 39. The shaft 41 extends transversely through the housing part 16 and has its outer end journaled in an anti-friction bearing 43 carried in an outer wall portion of the final-drive housing 15. The housing 15 includes an inwardly spaced wall 44 having an opening through which the shaft 41 passes, the wall 44 extending downwardly as at 45 to the lower portion of the housing 15. The shaft 41 carries thereon for rotation therewith a final-drive pinion 46 disposed between the anti-friction bearing 43 and the upper wall portion 44. The lower wall portion 45 carries an anti-friction bearing 47 which journals the inner end of a transverse stub axle 48. The axle 48 is splined and carries thereon for rotation therewith a final-drive bull gear 49 meshing with and driven by the pinion 46.

It will be understood that the final-drive housings 14 and 15 are preferably identical, and that the left-hand housing 14 contains a final-drive pinion and final-drive bull gear identical to those contained in the right-hand housing 15. As best shown in Figure 3, wherein the final-drive housing 14 is broken away at its left-hand side, the stub axle 48 extends transversely through the outer wall of the housing 14. The outer portion of the housing carries an anti-friction bearing 50 journaling the outer end of the axle. The axle at its outer end is provided with an enlarged flange portion 51 to which is secured a drive wheel 52. The stub axle 48 in the right-hand housing 15 is similarly associated with a second drive wheel 52'.

Referring again to the right-hand portion of Figure 3, it will be seen that the bottom of the final-drive housing 15 is provided with an opening 53 through which the lower portion of the bull gear 49 extends. This opening is closed by a cover 54 rigidly secured to the bottom of the housing 15. The left-hand housing 14 is provided with a similar arrangement. Both housings 14 and 15, together with the complementary covers 54, are adapted to contain lubricant for lubricating the drive gearing and bearings contained therein.

The upper wall portion 44 of the housing 15 at the left side of the drive pinion 46 is provided with a suitable lubricant seal 55 to prevent the escape of lubricant from the final-drive housing into the outer end of the transverse extension housing or supporting part 16. The connecting portions between the parts 16 and final-drive housing 15 are, as aforesaid, provided by the junction between the enlarged outer end of the part 16 and the inner open side of the upper portion of the housing 15. These enlarged portions of the housing part provide a brake chamber 56 in which a brake means is contained. This brake means is in the form of a brake drum 57 carried by the shaft 41 for rotation therewith. The brake is adapted to be operated by suitable mechanism to be presently described. The upper inner portion of the left-hand final-drive housing 14 is enlarged in a manner similar to that of the right-hand housing 15. The association between the housing 14 and the left side of the body part 13 provides a brake chamber 58 containing a brake means in the form of a brake drum 59 carried by the short drive shaft 37. The means for operating this brake will be next described.

Figure 4:
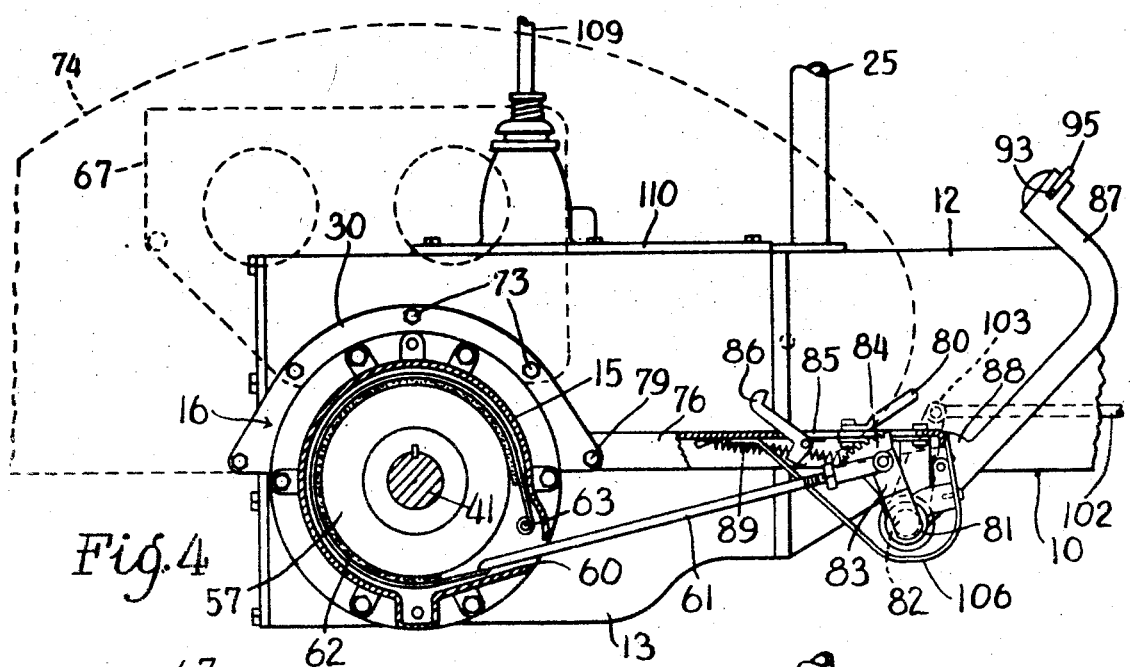
Figure 4 is a view of a portion of the rear part of the tractor, on an enlarged scale, taken substantially along the line 4—4 of Figure 1; and, Figure 5 is an enlarged view of a portion of the rear construction taken substantially along the line 5—5 of Figure 1.

Referring now to Figure 4, it will be seen that the final-drive housing 15 is provided at an upper forward portion thereof with an opening 60 through which is passed the rearward portion of a brake rod 61. The rear end of the brake rod 61 is suitably connected to a contracting brake band 62 which is wrapped around the brake drum 57 and anchored at 63 to a portion of the housing. The forward portion of the left-hand housing 14 is provided with an opening 64 through which is passed a brake rod 65 for operating the brake mechanism at the left side of the tractor. The brake drum 59 is provided with a contracting brake band 66 operated by the rod 65. The control members for operating the brake rods 61 and 65 will be described later in conjunction with the description of the operator's station.

Attention is directed again to Figure 3, wherein it is shown that two transversely spaced longitudinally extending supports 67 are secured respectively to the right-hand side of the body part 13 and to the outer flange 30 of the extension or supporting housing 16. The supports 67 respectively carry a pair of rearwardly extending leaf springs 68, each of which carries at its rear end a trunnion 69 disposed on a transverse axis. The trunnions are alined and adapted to carry therebetween an operator's seat 70. Each spring carries at its forward end an upstanding bracket 71 engaging the underside of the forward portion of the seat 70. The seat is adapted to be swung about the transverse axis provided by the trunnions 69, and is adapted when in normal position to be cradled between the trunnions 69 and the forward brackets 71. The leaf springs 68 provide for a desirable degree of resiliency contributing to the comfort of the operator. It will be noted that the seat construction including the supports 67 is generally in the form of a unit which may be readily removed from its position on the tractor. For this purpose there has been provided a plurality of bolts 72 for securing the inner support 67 to the body part 13 and a plurality of bolts 73 for securing the outer support 67 to the flange 30 on the extension or supporting housing 16.

A pair of fenders 74 is provided for the tractor, one being secured to the left-hand portion of the body part 13 and the other being secured by the bolts 73 to the outer flange 30 of the housing part 16. These fenders extend longitudinally of the tractor at opposite sides of the rear part of the tractor and serve to protect the operator. As best shown in Figure 1, it will be seen that the fender 74 and the rear frame or body part 13 of the tractor delineate opposite sides of an operator's station generally indicated at 75 extending entirely laterally of said body part and including the operator's seat 70.

The operator's station further includes a generally level platform 76 extending entirely laterally of the frame or body part 13. This platform is substantially rectangular in shape and is secured at its rear transverse edge to the housing part 16 by bolts 77. The right- and left-hand edges of the platform 76 are flanged and the left-hand flange is secured by bolts 78 to the right-hand side of the body part 13. The right-hand flange is secured at its rear portion by a bolt 79 to a forward portion of the flange 30 on the housing part 16. The forward part of the right-hand edge of the platform 76 is secured to a forward portion of the right-hand fender 74. The platform 76 is thus disposed rigidly between the right-hand housing 15 and the right-hand side of the body part 13, and is arranged at a level lower than the upper part of the body part. The platform is arranged generally below the steering wheel 23 so that the operator may stand on the platform and in this position operate the tractor. The tiltable seat 70 enables the operator to assume a standing position in comfort. The forward portion of the platform 76 further includes a forwardly and upwardly inclined, transverse foot rest 80.

Figure 5:
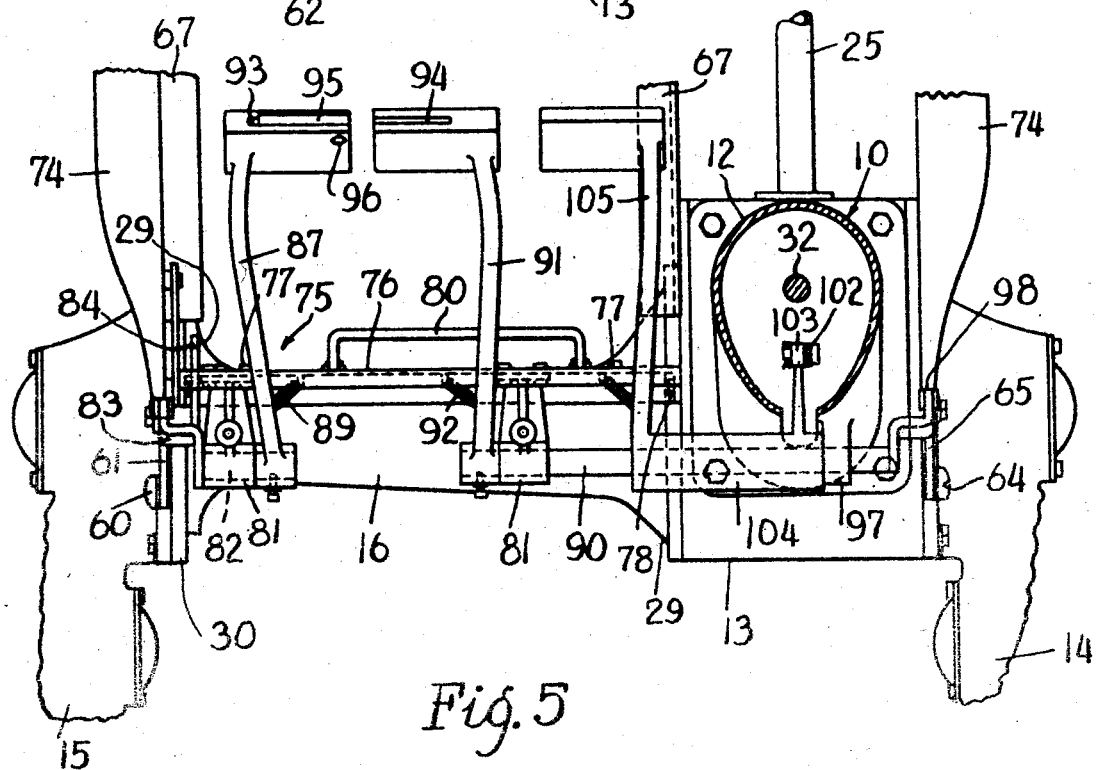

Referring now to Figures 4 and 5 it will be seen that the forward portion of the platform 76 has depending therefrom a pair of transversely spaced brackets or bearings 81. The left-hand bearing 81 journals a short rock-shaft 82 carrying at its outer end an upstanding arm 83 connected to the forward end of the longitudinally extending brake rod 61 at the right side of the tractor. The arm 83 includes at its upper portion a sector 84 provided with a plurality of teeth. The platform at this portion is slotted as at 85 and carries therebelow on a transverse axis a pivoted locking member 86. As shown in Figure 4, the locking member is in disengaged position. It will be seen that this member can be swung forwardly about its axis so that the dog portion thereon may be engaged with any of the teeth in the sector on the arm 83. In this manner the right-hand brake may be locked in any position. The inner end of the short rock-shaft 82 has rigidly carried thereon an upstanding brake pedal 87. An intermediate portion of the brake pedal 87 is provided with a stop 88 engageable with the flanged forward edge of the platform 76. A return spring 89 is connected between the brake pedal 87 and the platform 76. It will be noted that the brake rod 61 and the rock-shaft 82 are disposed entirely below the platform 76, thus leaving the upper portion of the platform substantially clear and free from obstructions.

The inner bracket 81 journals the outer end of a comparatively longer rock-shaft 90. This rock-shaft has rigidly carried thereon a brake pedal 91 extending upwardly generally parallel to the brake pedal 87. A return spring 92 is connected to this pedal and to the platform 76. The foot portion of the pedal 87 is provided at its forward edge with a transverse slot 93. The foot portion of the pedal 91 is similarly slotted as at 94. The pedal 87 carries a locking member 95 pivotable on a pivot pin 96. As shown in Figure 5, the locking member 95 is inoperatively carried in the slot 93 in the pedal 87. In the event that it becomes necessary or desirable to lock the two pedals together for simultaneous operation the locking member 95 is pivoted about the pin 96 until it drops into the slot 94 in the pedal 91.

The rock-shaft 90 extends across or below the intermediate body portion 12 and is journalled at its left-hand end in an ear 97 carried at an under portion of that body part. The extreme left-hand portion of the shaft 90 carries thereon a brake arm 98 connected to the forward end of the brake rod 65 for the left-hand brake means. It will be noted that no separate locking means is provided for locking the left-hand brake pedal in position with the brake band 66 contracted. The locking means on but one of the brake pedals is sufficient, since the pedals may be locked together by the locking member 95, thus locking both brakes.

As previously described, the power plant 11 includes the clutch 31. This clutch is adapted to be disengaged by a yoke 99 pivoted at its upper end to an ear 100 formed as part of the upper portion of the forward end of the intermediate body part 12. An intermediate portion of the yoke 99 engages a throw-out collar 101 associated with the clutch 31. The lower end of the yoke is pivotally connected to a longitudinally and rearwardly extending control element or link 102. The link 102 extends rearwardly below the transverse wall 34 in the body part 12 and is connected at its rear end to an upstanding arm 103 forming part of a rockable part 104. The control link is thus enclosed within the intermediate body part 12. The rockable part 104 takes the form of a sleeve having at one end thereof an integral upstanding clutch pedal 105. This pedal extends upwardly closely adjacent the right side of the rear body part 13 and is generally alined with the brake pedals 87 and 91. Since the arm 103 and pedal 105 are integral it will be seen that operation of the pedal 105 will serve to operate the clutch control yoke 99 for the purpose of disengaging and engaging the engine clutch 31.

Looking to Figures 1 and 4, it will be seen that the forward portion of the platform 76 carries a shield member 106 enclosing the rock-shafts 82 and 90 and the lower portions of the operating pedals 87, 91, and 105. The shield is slotted as at 107 to permit movement of the pedals without interference therewith.

The rear end construction further includes a draw-bar 108 secured to the lower portions of the final-drive housings 14 and 15.

The control member arrangement for the tractor is completed by the provision of a gear shift lever 109 mounted on a transmission case cover 110 enclosing the upper part of the rear body part 13.

From the foregoing description it will be seen that an improved rear end construction has been provided for a vehicle, and particularly for an agricultural tractor. The housing parts 14, 15, and 16 may be assembled and disassembled as separate units without disturbing the other parts of the tractor. Similarly the operator's seat and supports may be removed without disturbing the platform 76. The brake pedals and clutch pedal are conveniently located at the forward end of the platform and are appropriately shielded at their lower portions to prevent interference thereof with plants or the like which may be situated in the field over which the tractor may be operated. The entire arrangement of the operator's station including the platform 76 and the fenders 74 is compact and provides a convenient and comfortable operator's station for the operator. Said station occupies the space forwardly and above the longer extension housing which is otherwise unobstructed. The platform which occupies the lateral space between the rear frame or body part 13 and the final drive housing give ample room for an operator on the seat which is laterally within the confines of the platform. For the purpose of simplicity in manufacture and assembly, the housing parts 14 and 15 may be made identical so that either may be secured to either side of the tractor, it being necessary only to interpose the housing 16 between one of the housings 14 or 15 and the appropriate side of the tractor body part 13. The location of the operator's platform at a level lower than the upper portion of the body part 13 contributes to the comfort of the operator by providing for the arrangement of the brake pedals and clutch pedals at distances conveniently within reach of the operator.

Certain other features and objects of the invention will be apparent to those skilled in the art, and it will be appreciated that various modifications and alterations may be made in the preferred construction illustrated without departing from the spirit and scope of the invention as defined in the appended claims.

What is claimed is:

1. A rear end construction for a vehicle, comprising a longitudinal frame, a housing carried at and closely adjacent one side of the frame, a ground support carried by said housing, a second housing carried at and spaced a substantial distance transversely from the other side of the frame, a ground support carried by said second housing, an operator's platform disposed between the frame and the second housing and including a supporting part, means carrying one side of the platform on the frame, means carrying the other side of the platform on the second housing, and a control shaft carried by the supporting part and by the frame.

2. A rear end construction for a vehicle, comprising a longitudinal frame, a housing carried at and closely adjacent one side of the frame, a ground support carried by said housing, a second housing carried at and spaced a substantial distance transversely from the other side of the frame, a ground support carried by said second housing, an operator's station disposed between the frame and the second housing and including a seat, means carrying the seat at one side thereof on the frame, and means carrying the seat at the other side thereof on the second housing.

3. A rear end construction for a vehicle, comprising a longitudinal rear body part, a housing carried at one side of the body part and including a first transverse axle disposed closely adjacent that side of the body part, a second housing carried at the other side of the body part and including a second transverse axle, said second housing including a rigid supporting part spacing the second axle a substantial distance transversely at that side of the body part, wheels on the axles, and an operator's station disposed between the body part and the wheel on the second axle and including a seat, means carrying one side of the seat on the body part, and means carrying the other side of the seat on the supporting part.

4. A rear end construction for a vehicle, comprising a longitudinal frame, a ground support carried at and closely adjacent one side of the frame, a second ground support in transverse alinement with the first ground support and carried at and spaced a substantial distance transversely from the other side of the frame, an operator's station disposed between the frame and the second ground support and including a supporting part, and a plurality of control members carried by the supporting part.

5. A rear end construction for a vehicle, comprising a longitudinal rear body part including drive mechanism, a housing carried at one side of the body part and enclosing a first transverse axle disposed closely adjacent that side of the body part, a second housing carried at the other side of the body part and enclosing a second transverse axle, said second housing including a rigid supporting part spacing the second axle a substantial distance transversely at that side of the body part, wheel on the axles, differential drive means enclosed in the rear body part and interconnecting the axles and an operator's station disposed laterally of the body part and entirely between the body part and the wheel on the second axle.

6. A rear end construction for a vehicle, comprising a longitudinal frame, a housing carried at and closely adjacent one side of the frame, a ground support carried by said housing, a second housing carried at and spaced a substantial distance transversely from the other side of the frame, a ground support carried by said second housing, an operator's station disposed between the frame and the second housing and including a supporting part, and a control shaft carried by the supporting part and by the frame.

7. A vehicle construction comprising a longitudinal body including at its front end a power plant having a clutch, an intermediate, longitudinal housing connected at its forward end to the rear of the power plant, a rear axle structure connected at the rear of the housing, said axle structure carrying a pair of drive wheels, at least one of said wheels being spaced transversely a substantial distance from one side of said housing, an operator's station at the rear of the body disposed in the space between the housing and the aforesaid wheel, and a clutch control means mounted at the operator's station and including an operating connection to the clutch, said connection being enclosed in the intermediate housing.

8. A rear end construction for a vehicle, comprising a longitudinal rear body part, a short final-drive housing carried at one side of said body part, a relatively longer final-drive housing carried at the other side of said body part in transverse alinement with the first housing, shafts carried respectively by said housings and extending into the body part, drive means carried by the body part for driving said shafts, final-drive means respectively in the housings and connected respectively to the shafts, each final-drive means including a drive axle, wheels mounted on said axles, and a driver's platform mounted entirely laterally of the body part and within the space forwardly and above the aforesaid longer housing and including an operator's seat.

9. A rear end construction for a vehicle, comprising a longitudinal rear body part, a housing carried at one side of the body part and including brake means and a first transverse axle disposed closely adjacent that side of the body part, a drive housing carried at the other side of the body part and including brake means and a second transverse axle, said second housing including a rigid supporting part spacing the second axle a substantial distance transversely of that side of the body part, wheels on the axles, an operator's station disposed in its entirety laterally of the body part and between the body part and the wheel on the second axle, and a brake operating means mounted at one side of the aforesaid supporting part and connected with the aforesaid brake means.

10. A rear end construction for a vehicle, comprising a longitudinal rear body part, a short final-drive housing carried at one side of said body part, a relatively longer final-drive housing carried at the other side of said body part in transverse alinement with the first housing, shafts carried respectively by said housings and extending into the body part, brake means for each shaft, drive means carried by the body part for driving said shafts, final-drive means respectively in the housings and connected respectively to the shafts, each final-drive means including an axle, wheels mounted on said axles, a driver's platform mounted in its entirety laterally of the body part and above the aforesaid longer housing and including an operator's seat, and brake operating pedals carried by the platform and connected respectively to the aforesaid brake means.

11. A rear end construction for a vehicle, comprising a longitudinal rear body part containing drive gearing, a final-drive housing carried at one side of said body part and containing drive gearing including an axle, a transverse extension housing carried at its inner end at the other side of said body part, a second final-drive housing carried at the outer end of said extension housing and containing drive gearing including an axle, wheels on the axles, drive means connecting the final-drive gearing with the drive gearing in the body part, and a driver's station including a seat mounted over the extension housing entirely laterally of the rear body part and between said body and the second final drive housing.

12. A rear end construction for a vehicle, comprising a longitudinal frame, a housing carried at and closely adjacent one side of the frame, a ground support carried by said housing, a second housing carried at and spaced a substantial distance transversely from the other side of the frame and including a rigid transverse extension part secured to the frame, a ground support carried by said second housing, an operator's station disposed between the frame and the second housing above the extension part and including a generally horizontal platform extending forwardly of the extension part at a level below the top of the frame, said platform being secured at its rear end to the extension part and at its forward end to the frame, and a control shaft disposed substantially parallel to the extension part and carried by the platform and by the frame.

13. A rear end construction for a vehicle comprising a longitudinal frame, a housing carried at and closely adjacent one side of the frame, a ground support carried by said housing, a second housing carried at and spaced a substantial distance transversely from the other side of the frame and including a rigid transverse extension part secured to the frame, a ground support carried by said second housing, an operator's station disposed between the frame and the second housing above the extension part and including a generally level platform extending forwardly of the extension part, and a control shaft disposed substantially parallel to the extension part and carried by the platform and by the frame.

14. A rear end construction for a vehicle, comprising a longitudinal frame, a housing carried at and closely adjacent one side of the frame and containing brake means, a ground support carried by said housing, a second housing carried at and spaced a substantial distance transversely from the other side of the frame and containing brake means, a ground support carried by said second housing, an operator's station disposed between the frame and the second housing and including a supporting part, a brake control member carried by the supporting part and operatively connected to the brake means in the second housing, and a second brake control member carried by the support and including a rockshaft extending across the frame and connected to the brake means in the first housing.

15. A rear end construction for a vehicle, comprising a rear body part including a transmission housing, a short drive-shaft housing structure connected to one side of said transmission housing at the rear thereof, a relatively longer drive-shaft housing structure connected in alinement at the other side of said transmission housing, shafts carried by said housing structures and extending into the transmission housing, a differential assembly mounted on the adjacent inner ends of said shafts, stub axles mounted on the housing structures below the shafts, gearing for driving said axles from said shafts, wheels mounted on said axles, a fender mounted at the outer end of the longer housing structure, a driver's platform mounted entirely laterally of the rear body part between said fender and the transmission housing, and an operator's seat mounted above said platform within the lateral confines of the platform.

16. A rear end construction for a vehicle, comprising a rear body part including a transmission housing, a short drive-shaft housing structure connected to one side of said transmission housing at the rear thereof, a relatively longer drive-shaft housing structure connected in alinement at the other side of said transmission housing, shafts carried by said housing structures and extending into the transmission housing, a differential assembly mounted on the adjacent inner ends of said shafts, stub axles mounted on the housing structures below the shafts, gearing for driving said axles from said shafts, wheels mounted on said axles, a fender mounted at the outer end of the longer housing structure, a driver's platform mounted entirely laterally of the rear body part between said fender and the transmission housing, an operator's seat mounted above said platform within the lateral confines of the platform, and a plurality of foot-operated controlling members mounted at the front of said platform.

17. A rear end construction for a vehicle, comprising a rear body part including a transmission and differential housing, a drive-shaft housing connected to one side of said first housing at the rear thereof, an extension housing connected with the other side of said first housing, a drive-shaft housing connected at the outer end of said extension housing, shafts carried by said housings and extending into the transmission housing, a differential assembly mounted on the adjacent inner ends of said shafts, stub axles mounted on the shaft housings below the shafts, gearing for driving said axles from said shafts, wheels mounted on said axles, a fender mounted at the outer end of the extension housing, a driver's platform mounted entirely laterally of the rear body part between the fender and the transmission housing and extending forwardly from the extension housing.

18. A rear end construction for a vehicle, comprising a rear body part including a transmission and differential housing, a drive-shaft housing connected to one side of said first housing at the rear thereof, an extension housing connected with the other side of said first housing, a drive-shaft housing connected at the outer end of said extension housing, shafts carried by said housings and extending into the transmission housing, a differential assembly mounted on the adjacent inner ends of said shafts, stub axles mounted on the shaft housings below the shafts, gearing for driving said axles from said shafts, wheels mounted on said axles, a fender mounted at the outer end of the extension housing, a driver's platform mounted entirely laterally of the rear body part between the fender and the transmission housing and extending forwardly from the extension housing, a seat mounted above said platform within the lateral confines of the platform, and a plurality of foot-operated controlling members mounted at the front of said platform.

19. A rear end construction for a vehicle, comprising a longitudinal rear body part containing drive gearing, a final-drive housing carried at one side of said body part closely adjacent thereto and containing drive gearing including an axle and brake means, a transverse extension housing carried at its inner end at the other side of said body part, a second final-drive housing carried at the outer end of said extension housing and containing drive gearing including an axle and brake means, wheels on the axles, drive means connecting the final-drive gearing with the drive gearing in the body part, a driver's platform mounted on the extension housing entirely laterally of the rear body part, a seat mounted above said platform entirely laterally of said body part, and a control member mounted on the platform and including a connection to one of the aforesaid brake means.

20. A vehicle construction comprising a longitudinal main body structure having at its forward end a power plant including a clutch, a longitudinal, intermediate housing part connected at its forward end to the power plant and enclosing the clutch, a rear body part connected at the rear of the intermediate housing and containing drive mechanism, a drive connection between the clutch and the drive mechanism and enclosed in the housing, a final-drive housing carried at and closely adjacent one side of the rear body part and including a drive wheel, a second final-drive housing carried at and spaced transversely a substantial distance from the other side of the rear body part and including a drive wheel, an operator's station disposed between the second final-drive housing and the rear body part, a clutch control member mounted at said station and including a transverse rockable part extending in proximity to the intermediate housing, and a longitudinal control element enclosed by said intermediate housing and connecting the rockable part of the clutch.

21. A vehicle construction comprising a longitudinal main body structure having at its forward end a power plant including a clutch, a longitudinal, intermediate housing part connected at its forward end to the power plant and enclosing the clutch, a rear body part connected at the rear of the housing and containing drive mechanism, a drive connection between the clutch and the drive mechanism and enclosed in the housing, a final-drive housing carried at and closely adjacent one side of the rear body part and including a drive wheel, a second final-drive housing carried at and spaced transversely a substantial distance from the other side of the rear body part and including a drive wheel, an operator's station disposed between the second final-drive housing and the rear body part and including a generally level platform extending forwardly substantially to the junction between the rear body part and the intermediate housing, a clutch control member journaled below said platform and including a transverse rockable part extending in proximity to the intermediate housing, and a longitudinal control element enclosed by said intermediate housing and connecting the rockable part and the clutch.

22. A vehicle construction comprising a longitudinal main body structure having at its forward end a power plant including a clutch, a longitudinal, intermediate housing part connected at its forward end to the power plant and enclosing the clutch, a rear body part connected at the rear of the housing and containing drive mechanism, a drive connection between the clutch and the drive mechanism and enclosed in the housing, a final-drive housing carried at and closely adjacent one side of the rear body part and including a drive wheel and brake means, a second final-drive housing carried at and spaced transversely a substantial distance from the other side of the rear body part and including a drive wheel and brake means, an operator's station disposed between the second final-drive housing and the rear body part and including a generally level platform extending forwardly substantially to the junction between the rear body part and the intermediate housing, a rock-shaft journaled below said platform, a brake control member carried on said rock-shaft and connected to one brake means, a clutch control member carried by the rock-shaft, and a longitudinal control element enclosed by said intermediate housing and connecting the clutch control member and the clutch.

23. A rear end construction for a vehicle, comprising a longitudinal rear body part, a housing carried at one side of the body part and including brake means and a first transverse axle disposed closely adjacent that side of the body part, a drive housing carried at the other side of the body part and including brake means and a second transverse axle, said second housing including a rigid supporting part spacing the second axle a substantial distance transversely of that side of the body part, wheels on the axles, an operator's station disposed between the body part and the wheel on the second axle, a brake operating means mounted forwardly of the aforesaid supporting part and connected with the aforesaid brake means, and a shield enclosing the forward portion of the brake operating means.

24. A rear end construction for a vehicle, comprising a longitudinal rear body part, a short final-drive housing carried at one side of said body part, a relatively longer final-drive housing carried at the other side of said body part in transverse alinement with the first housing, shafts carried respectively by said housings and extending into the body part, brake means for each shaft, drive means carried by the body part for driving said shafts, final-drive means respectively in the housings and connected respectively to the shafts, each final-drive means including an axle, wheels mounted on said axles, a driver's platform mounted above the aforesaid longer housing and including an operator's seat, brake operating pedals carried by the platform and connected respectively to the aforesaid brake means, and a shield carried by the platform enclosing the lower portions of the brake operating pedals.

25. A rear end construction for a vehicle, comprising a longitudinal frame, a ground support carried at one side of the frame, a second ground support in transverse alinement with the first ground support and carried at the other side of the frame, an operator's station disposed at one side of the frame between the frame and the second ground support and including a supporting part, and a plurality of control members carried by the supporting part.

26. A rear end construction for a vehicle, comprising a longitudinal rear body part, a housing carried closely adjacent one side of the body part and including brake means and a first transverse axle, a drive housing carried at a spaced position at the other side of the body part and including brake means and a second transverse axle, said second housing including a rigid spacing and supporting part, wheels on the axles, an operator's station disposed entirely laterally to one side of the body part and entirely between the body part and the wheel on the second axle, and a brake operating means mounted forwardly of the aforesaid supporting part and connected with the aforesaid brake means.

27. A rear end construction for a vehicle, comprising a longitudinal frame, a housing disposed at one side of the frame, a ground support carried by said housing, a second housing carried at the other side of the frame and including a rigid transverse extension part secured to the frame, a ground support carried by said second housing, an operator's station disposed between the frame and the second housing above the extension part and including a generally horizontal platform extending forwardly of the extension part at a level below the top of the frame, said platform being secured at its rear end to the extension part and at its forward end to the frame, and a control shaft disposed substantially parallel to the extension part and carried by the platform and by the frame.

28. A rear end construction for a vehicle, comprising a longitudinal frame, a housing carried at one side of the frame and containing brake means, a ground support carried by said housing, a second housing carried at the other side of the frame and containing brake means, a ground support carried by said second housing, an operator's station disposed between the frame and the second housing and including a supporting part, a brake control member carried by the supporting part and operatively connected to the brake means in the second housing, and a second brake control member carried by the support and including a rock-shaft extending across the frame and connected to the brake means in the first housing.

29. A vehicle construction comprising a longitudinal main body structure having at its forward end a power plant including a clutch, a longitudinal, intermediate housing part connected at its forward end to the power plant and enclosing the clutch, a rear body part connected at the rear of the intermediate housing and containing drive mechanism, a drive connection between the clutch and the drive mechanism and enclosed in the housing, a final-drive housing carried at one side of the rear body part and including a drive wheel, a second final-drive housing carried at the other side of the rear body part and including a drive wheel, an operator's station disposed at one side of the rear body part between the second final-drive housing and the rear body part, a clutch control member mounted at said station and including a transverse rockable part extending in proximity to the intermediate housing, and a longitudinal control element enclosed by said intermediate housing and connecting the rockable part and the clutch.

30. A vehicle construction comprising a longitudinal main body structure having at its forward end a power plant including a clutch, a longitudinal, intermediate housing part connected at its forward end to the power plant and enclosing the clutch, a rear body part connected at the rear of the housing and containing drive mechanism, a drive connection between the clutch and the drive mechanism and enclosed in the housing, a final-drive housing carried at one side of the rear body part and including a drive wheel, a second final-drive housing carried at the other side of the rear body part and including a drive wheel, an operator's station disposed between the second final-drive housing and the rear body part and including a generally level platform extending forwardly substantially to the junction between the rear body part and the intermediate housing, a clutch control member journaled below said platform and including a transverse rockable part extending in proximity to the intermediate housing, and a longitudinal control element enclosed by said intermediate housing and connecting the rockable part and the clutch.

31. A rear end construction for a vehicle, comprising a longitudinal rear body part, a housing carried at one side of the body part and including brake means and a first transverse axle, a drive housing carried at the other side of the body part and including brake means and a second transverse axle, said second housing including a rigid supporting part, wheels on the axles, an operator's station disposed between the body part and the wheel on the second axle, a brake operating means mounted forwardly of the aforesaid supporting part and connected with the aforesaid brake means, and a shield enclosing the forward portion of the brake operating means.

32. A rear end construction for a vehicle, comprising a longitudinal rear body part, a final-drive housing carried at one side of said body part, a second final-drive housing carried at the other side of the said body part in transverse alinement with the first housing, shafts carried respectively by said housings and extending into the body part, brake means for each shaft, drive means carried by the body part for driving said shafts, final-drive means respectively in the housings and connected respectively to the shafts, each final-drive means including an axle, wheels mounted on said axles, a driver's platform mounted above the aforesaid second housing and including an operator's seat, brake operating pedals carried by the platform and connected respectively to the aforesaid brake means, and a shield carried by the platform enclosing the lower portions of the brake operating pedals.

33. A rear end construction for a vehicle, comprising a longitudinal frame including driving mechanism, a housing carried at and closely adjacent one side of the frame and including a ground support, drive means enclosed in said housing and connecting the drive mechanism and the ground support, a second housing carried at and spaced transversely a substantial distance from the other side of the frame and including a ground support, drive means enclosed in the second housing and connecting the drive mechanism and that ground support, a seat carried between the second housing and the proximate side of the frame, and control means carried at the same side of the frame.

34. A rear end construction for a vehicle, comprising a longitudinal frame including drive mechanism, a housing carried at and closely adjacent one side of the frame, a ground support carried by said housing, drive means enclosed in said housing and connecting the drive mechanism and the ground support, a second housing carried at and spaced a substantial distance transversely from the other side of the frame, a ground support carried by said second housing, drive means enclosed in said housing and connecting the drive mechanism and the ground support, and an operator's station disposed between the frame and the second housing.

WILLIAM C. ROSENTHAL.

CERTIFICATE OF CORRECTION.

Patent No. 2,247,668.　　　　　　　　　　　　　　　July 1, 1941.

WILLIAM C. ROSENTHAL.

It is hereby certified that error appears in the printed specification of the above numbered patent requiring correction as follows: Page 6, second column, line 14, claim 20, for the word "of" read --and--; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.